3,118,953
1,3-DI-(p-CYCLOPENTEN-2-YL-PHENOXY)-
PROPANOL-2
Ivan M. Cutukovic, Chicago, Ill., assignor to Velsicol Chemical Corporation, Chicago, Ill., a corporation of Illinois
No Drawing. Filed Aug. 16, 1960, Ser. No. 49,833
1 Claim. (Cl. 260—613)

This invention relates to the production of a new substituted di-phenoxy alcohol, and, more particularly, to the compound 1,3-di-(p-cyclopenten-2-yl-phenoxy)-propanol-2.

The aforesaid compound of this invention is invaluable as an intermediate in the production of such useful products as diepoxide compositions having desirable epoxy moieties, and cast and molded products and coatings made therefrom, and as the starting material for a number of useful chemical derivatives.

It is therefore one object of the present invention to provide an intermediate for the production of a valuable diepoxide composition having desirable epoxy moieties.

Another object relates to the production of said diepoxide composition.

Another object of the present invention is to provide an intermediate in the production of film coatings, such as varnishes and the like.

These and other objects of the present invention will become apparent from the ensuing description.

The new compound 1,3-di-(p-cyclopenten-2-yl-phenoxy)-propanol-2 can be readily prepared, for example, in a two-step synthesis from phenol, cyclopentadiene, and epichlorohydrin. In the first step phenol is reacted with cyclopentadiene in the presence of a catalytic agent, such as phosphoric acid. The product thereof consists substantially of p-cyclopentenyl phenol, o-cyclopentenyl phenol, and 2,4-dicyclopentenyl phenol. By an adjustment of the conditions and the proportion of the reactants, either mono-cyclopentenyl phenol isomer can be primarily produced. In the second step, the desired para-isomer of the first step is reacted with epichlorohydrin in a basic solution, such as that formed by the addition of an alkali metal hydroxide, for example, sodium hydroxide.

The following synthesis is set forth to illustrate the preparation of 1,3-di-(p-cyclopenten-2-yl-phnenoxy)-propanol-2: The first reaction forms cyclopentenyl phenol from phenol and cyclopentadiene according to the procedure of Bader, J.A.C.S., 75, p. 5967 (1953). According to Bader, reaction at room temperature yields about 70% of the para-isomer, while reaction at higher temperatures, e.g., at about reflux temperature yields primarily the ortho-isomer. Thus, since the para-isomer is desired, a reaction temperature of about room temperature is preferred. It is also reported in said article that greater quantities of phosphoric acid should be used when attempting to produce the para-isomer, and only catalytic amounts of phosphoric acid are needed to obtain the ortho-isomer. The above reaction proceeds readily when the phenol is dissolved in an aromatic or aliphatic solvent; such as benzene, toluene, heptane, hexane, or the like; and in the presence of up to and greater than 20% of phosphoric acid by weight of the total reactants. It has also been found that the mono-cyclopentenyl isomers are primarily formed when a large excess of phenol is present, and that the dicyclopentenyl compound is formed when there is a deficient quantity of phenol. The desired para-isomer is isolated from the reaction mixture after the reaction is complete, by neutralization or recovery of the phosphoric acid, removal by distillation of the reaction solvent and excess phenol, and fractional distillation of the isomers which is aided by the fact that the para-isomer crystallizes when relatively pure while the ortho-isomer remains a liquid.

The isolated p-(2-cyclopentenyl) phenol is next reacted with a half mole, or a slight excess thereof, of epichlorohydrin per mole of cyclopentenyl phenol, in a basic solution. It is essential that approximately a half mole of base, such as an alkali metal hydroxide, be used. While the exact mechanism of the reaction is not completely understood, it is believed that the alkali metal salt of cyclopentenyl phenol reacts with the epichlorohydrin to form cyclopentenyl phenyl glycidyl ether and that additional cyclopentenyl phenol reacts with the ether at the epoxy linkage to form 1,3-di-(p-cyclopenten-2-yl-phenoxy)-propanol-2. Thus, the utilization of one-half mole of epichlorohydrin and one-half mole of alkali metal hydroxide, will provide one-half mole of cyclopentenyl phenyl glycidyl ether to react with the remaining one-half mole of cyclopentenyl phenol to yield one mole of 1,3-di-(p-cyclopenten-2-yl-phenoxy)-propanol-2.

The following examples are set forth to illustrate the preparation of the new compositions of the present invention:

EXAMPLE 1

Preparation of p-Cyclopentenyl Phenol

A three-necked, round-bottom flask, fitted with a mechanical stirrer, reflux condenser, dropping funnel, and internal thermometer, was charged with a solution of phenol (879 g.; 9.35 moles) in one liter of toluene, and 85% phosphoric acid (300 g.) The solution was stirred, and 825 ml. of 1:1 volume ratio solution of cycolpentadiene (330 g.; 5 moles) in toluene was slowly added, at a temperature maintained at 15–25° C. After the addition was completed, the temperature was raised to and maintained at 25–30° C., while the reaction mixture was stirred for about 18 hours. Sodium carbonate (180 g.) was slowly added with stirring to prevent uncontrolled frothing of the mixture. The resulting mixture was stirred for about 1 hour at room temperature. The reaction mixture was then filtered with suction through a small bed of kieselguhr, the solvent of the filtrate removed by distillation in vacuo, and the unreacted phenol removed by a similar distillation in vacuo until an overhead temperature of 75° C. at 2.5 mm. of mercury had been reached. The residue of the distillation was distilled in vacuo to yield a fraction (81 g.) of o-cyclopentenyl phenol, which was collected from 92° to 114° C. at 2.5 mm. of mercury, and a fraction (447.5 g.) of p-cyclopentenyl phenol, which was collected from 114° to 145° C. at 2.5 mm. of mercury.

The p-cyclopentenyl phenol thus produced can be used as such or can be purified by recrystallization from a suitable solvent such as hexane or pentane, to yield white crystalline needles having a melting point of 64–65° C. and a boiling point of 114–117° C. at 1.5 mm. of mercury.

EXAMPLE 2

Preparation of 1,3-Di-(p-Cyclopenten-2-Yl-Phenoxy)-Propanol-2

A three necked, round-bottom flask fitted with a mechanical stirrer, reflux condenser, internal thermometer, and dropping funnel, is charged with p-cyclopentenyl phenol (80 g.; 0.5 mol; recrystallized product of Example 1) and epichlorohydrin (23 g.; 0.25 mol). The mixture is vigorously stirred and an aqueous solution of sodium hydroxide (10 g.; 0.25 mole; in 50 ml. water) is slowly added over a period of 3 hours while the temperature is controlled at from 70 to 80° C. After the sodium hydroxide has been added the temperature is raised to 100° C. and the reaction mixture is stirred for an additional hour. The reaction product is then cooled and washed with several portions of diethyl ether. The ether extracts are combined, washed with water, and dried over anhydrous sodium sulfate. The ether is stripped from the dried solution by distillation in vacuo, and the product 1,3-di-(p-cyclopenten-2-yl-phenoxy)-propanol-2 is crystallized from hexane to recover crystals having a melting point of 68–70° C.

1,3-di-(p-cyclopenten-2-yl-phenoxy)-propanol-2, prepared in a manner similar to that described above had the following analysis for $C_{25}H_{28}O_3$:

|  | C | H |
|---|---|---|
| Theoretical | 79.80 | 7.44 |
| Found | 79.93 | 7.66 |

The aforesaid new compound of this invention is especially useful as an intermediate in the production of useful diepoxide monomers, which can be formulated and cured into cast products, molded products, spray coatings, and the like. Thus, it can readily be epoxidized by contact with a twice molar quantity of an epoxidizing agent, such as peracetic acid. The peracid is added slowly with stirring to a solution of the product of Example 2 in an inert solvent, such as diethyl ether. After the reaction is complete, the reaction product is worked up by separating from water, extracting with several portions of diethyl ether, drying, and stripping of the ether solvent. The crude product can be used as such, or can be purified by distilling in vacuo to recover the relatively pure compound of 1,3-di[p-(-2,3-epoxycyclopentyl)-phenoxy]-propanol-2.

Casts of the polymerized diepoxide composition of this invention can be readily prepared by reacting the diepoxide monomer with a liquid anhydride curing agent, such as methyl nadic anhydride or dodecenyl succinic anhydride, and curing. More specifically, the diepoxide monomer is mixed with a trihydric alcohol and the anhydride, and heated until a solution is formed. The diepoxide monomer will not directly react with the anhydride, and therefore, the anhydride is first reacted with the alcohol to form acid groups, which will react with the diepoxide monomer.

The formulation is polymerized or "cured" by treating at relatively high temperatures for sustained periods. While these diepoxide cast formulations can be cured at a high temperature without pre-treatment, it is preferred to pre-treat the cast formulations so as to prevent stress from the thermal shock accompanying the sudden high temperature. The pre-treatment may vary with the formulation and the projected use. Primarily, the pre-treatment consists of subjecting the cast formulation to an intermediate temperature for a sustained period.

The diepoxide monomer of this invention can also be formulated into various other products, such as film coatings in varnishes and the like. Varnishes of the diepoxide monomer can readily be made by forming a solution with a solvent and a curing agent. Alternatively, a drying fatty acid can be cooked into a solution of the diepoxide monomer, eliminating the curing agent of the former procedure.

I claim:

The compound 1,3-di-(p-cyclopenten-2-yl-phenoxy)-propanol-2.

References Cited in the file of this patent

UNITED STATES PATENTS

| 2,848,426 | Newey | Aug. 16, 1958 |
| 2,943,095 | Farnham et al. | June 8, 1960 |
| 2,965,607 | Martin et al. | Dec. 20, 1960 |
| 2,973,373 | Phillips et al. | Feb. 28, 1961 |